(12) United States Patent
Onoue et al.

(10) Patent No.: US 11,909,931 B2
(45) Date of Patent: Feb. 20, 2024

(54) FEEDING DEVICE AND IMAGE FORMING APPARATUS

(71) Applicant: FUJIFILM Business Innovation Corp., Tokyo (JP)

(72) Inventors: Yohei Onoue, Kanagawa (JP); Hiroaki Fujikura, Kanagawa (JP); Yoshiyuki Kitazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/951,604

(22) Filed: Sep. 23, 2022

(65) Prior Publication Data

US 2023/0308567 A1 Sep. 28, 2023

(30) Foreign Application Priority Data

Mar. 28, 2022 (JP) .................................. 2022-052247

(51) Int. Cl.
*G06K 15/00* (2006.01)
*H04N 1/00* (2006.01)

(52) U.S. Cl.
CPC ..... *H04N 1/00588* (2013.01); *H04N 1/00647* (2013.01); *H04N 1/00716* (2013.01); *H04N 1/00718* (2013.01); *H04N 1/00726* (2013.01); *H04N 2201/0082* (2013.01)

(58) Field of Classification Search
None
See application file for complete search history.

(56) References Cited

U.S. PATENT DOCUMENTS

| 5,899,449 | A | * | 5/1999 | Acquaviva | ........... | B65H 3/0833 |
|---|---|---|---|---|---|---|
| | | | | | | 271/93 |
| 2011/0090279 | A1 | * | 4/2011 | Yanagi | ................... | B65H 31/22 |
| | | | | | | 347/21 |
| 2011/0215520 | A1 | * | 9/2011 | Tsuchiya | ............. | G03G 15/6576 |
| | | | | | | 271/209 |
| 2012/0074639 | A1 | * | 3/2012 | Suzuki | ................... | B65H 9/002 |
| | | | | | | 271/5 |
| 2012/0161384 | A1 | * | 6/2012 | Suzuki | ..................... | B65H 3/48 |
| | | | | | | 271/11 |
| 2016/0089912 | A1 | * | 3/2016 | Chiba | .................. | B41J 11/0005 |
| | | | | | | 347/104 |
| 2022/0004138 | A1 | * | 1/2022 | Okitsu | ............... | G03G 15/5062 |

FOREIGN PATENT DOCUMENTS

JP 2012-106818 A 6/2012

* cited by examiner

*Primary Examiner* — Dung D Tran
(74) *Attorney, Agent, or Firm* — Oliff PLC

(57) ABSTRACT

A feeding device includes: a feeder that feeds a first medium disposed on a top of plural media loaded; a detector that detects at least one of a curved state and an inclination of the first medium and following media including a second medium disposed immediately below the first medium; and a modifier that modifies a condition related to a feeding operation of the feeder based on the at least one of the curved state and the inclination detected by the detector.

12 Claims, 10 Drawing Sheets

FIG. 6
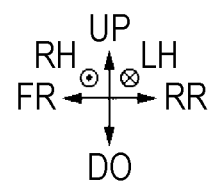
FIG. 7
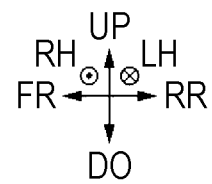
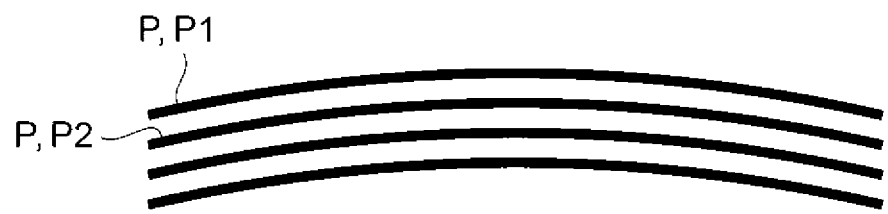

FEEDING DEVICE AND IMAGE FORMING APPARATUS

CROSS-REFERENCE TO RELATED APPLICATIONS

This application is based on and claims priority under 35 USC 119 from Japanese Patent Application No. 2022-052247 filed Mar. 28, 2022.

BACKGROUND

(i) Technical Field

The present disclosure relates to a feeding device and an image forming apparatus.

(ii) Related Art

Japanese Unexamined Patent Application Publication No. 2012-106818 discloses a feeding device including: a loading tray on which sheets of paper are loaded; a floating device that floats the sheets of paper by blowing air to the end thereof loaded on the loading tray; an air volume adjustment control device that performs adjustment control of the volume of air discharged from the floating device; a sheet feeding device that feeds the sheets of paper floated by the floating device one by one; and a curl detection device that detects the direction of curl occurred in the uppermost sheet of paper loaded on the loading tray, and an amount of curl which is a vertical distance between a portion at the highest position and a portion at the lowest position of the uppermost sheet of paper placed horizontally. The air volume adjustment control device performs adjustment control of the amount of air discharged from the floating device based on a result of detection by the curl detection device.

SUMMARY

In a feeding device including a feeder that feeds a first medium disposed on the top of a plurality of media loaded, when only the curved state of the first medium is detected and a condition related to a feeding operation of the feeder is modified based on the curved state, if the curved states are different between the first medium, and following media P including the subsequent medium P2, a feed failure may occur in the following media P including the subsequent medium P2.

Aspects of non-limiting embodiments of the present disclosure relate to preventing an occurrence of a feed failure in a feeding device including a feeder that feeds a first medium disposed on the top of a plurality of media loaded, the feed failure occurring in following media including the second medium disposed immediately below the first medium, as compared to when only the curved state of the first medium is detected and a condition related to a feeding operation of the feeder is modified based on the curved state.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a feeding device including: a feeder that feeds a first medium disposed on a top of a plurality of media loaded; a detector that detects at least one of a curved state and an inclination of the first medium and following media including a second medium disposed immediately below the first medium; and a modifier that modifies a condition related to a feeding operation of the feeder based on the at least one of the curved state and the inclination detected by the detector.

BRIEF DESCRIPTION OF THE DRAWINGS

Exemplary embodiment of the present disclosure will be described in detail based on the following figures, wherein:

FIG. 6 is a pattern diagram illustrating a curved state indicating convex downward, occurred in a width direction at a front end of a recording medium;

FIG. 7 is a pattern diagram illustrating a curved state indicating convex upward, occurred in a width direction at a front end of a recording medium;

DETAILED DESCRIPTION

Hereinafter, an example of an exemplary embodiment according to the present disclosure will be described with reference to the drawings.

(Image Forming Apparatus 10)

Figure 1:
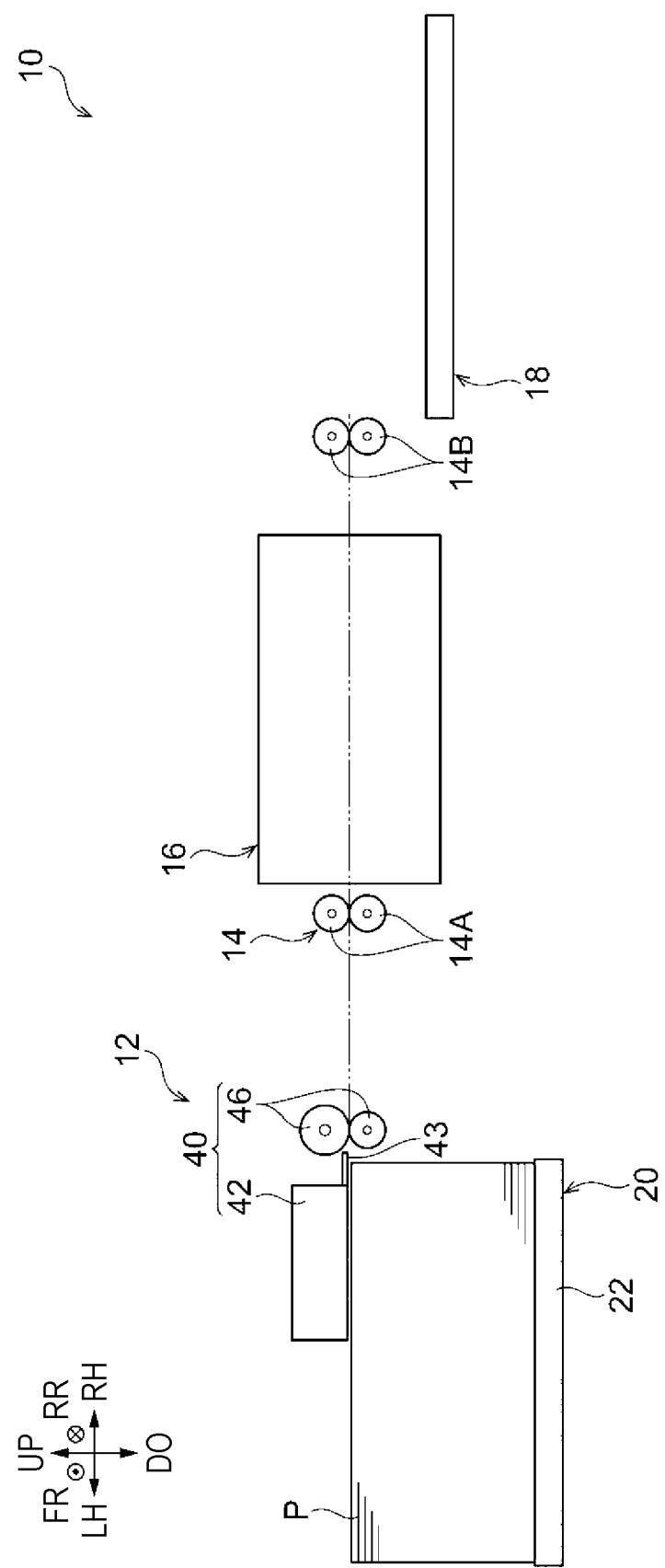
FIG. 1 is a schematic view illustrating an image forming apparatus according to an exemplary embodiment.

First, the configuration of an image forming apparatus 10 according to the exemplary embodiment will be described. FIG. 1 is a schematic view illustrating the configuration of the image forming apparatus 10 according to the exemplary embodiment.

Note that an arrow UP in the drawings indicates the upward direction (specifically, vertical upward) of the apparatus, and an arrow DO indicates the downward direction (specifically, vertical downward) of the apparatus. In addition, an arrow LH in the drawings indicates the leftward direction of the apparatus, and an arrow RH indicates the rightward direction of the apparatus. Also, an arrow FR in the drawings indicates the forward direction of the apparatus, and an arrow RR indicates the rearward direction of the apparatus. These directions are defined for convenience of description, thus the configuration of the apparatus is not restricted by these directions. In each direction of the apparatus, the word "apparatus" may be omitted in some cases. Specifically, for example, "the upward direction of the apparatus" may be simply referred to as "the upward direction".

Also, in the description below, "the upward-downward direction" may be used in the sense of "both upward and downward directions" or "either one of the upward and downward directions". "The rightward-leftward direction" may be used in the sense of "both rightward and leftward directions" or "either one of the rightward and leftward directions". "The rightward-leftward direction" may be referred to as the cross direction, the lateral direction, and the horizontal direction. "The forward-rearward direction" may be used in the sense of "both forward and rearward directions" or "either one of the forward and rearward directions". "The forward-rearward direction" may be referred to as the cross direction, the lateral direction, and the horizontal direction. The upward-downward direction, the rightward-leftward direction, the forward-rearward direction are directions perpendicular to each other (specifically, orthogonal directions).

The symbol "O" with "x" inside thereof indicates an arrow pointing from the near side to the far side of the paper surface. Also, the symbol "O" with "." inside thereof indicates an arrow pointing from the far side to the near side of the paper surface.

The image forming apparatus 10 illustrated in FIG. 1 is an apparatus that forms an image on a recording medium P as an example of a medium. Specifically, as illustrated in FIG. 1, the image forming apparatus 10 includes a feeding device 12, a transporter 14, an image former 16, and a discharger 18. Hereinafter, each component of the image forming apparatus 10 will be described.

(Transporter 14)

The transporter 14 illustrated in FIG. 1 is a component unit that transports a recording medium P in the image forming apparatus 10. The transporter 14 has a function of transporting a recording medium P fed from the feeding device 12 to the image former 16, and a function of transporting a recording medium P with an image formed by the image former 16 to the discharger 18.

Specifically, the transporter 14 has transport members 14A, 14B each configured by a pair of transport rollers. In the transporter 14, the transport member 14A transports a recording medium P fed from the feeding device 12 to the image former 16, and the transport member 14B transports a recording medium P with an image formed by the image former 16 to the discharger 18.

Note that the transport members 14A, 14B are not limited to a pair of transport rollers. The transport members 14A, 14B each may be a transport member such as a transport belt or a transport drum, and it is possible to use various types of transport members.

(Image Former 16)

The image former 16 illustrated in FIG. 1 is a component unit that forms an image on a recording medium P fed from the feeding device 12. As the image former 16, for example, an ink jet image former that forms an image on a recording medium using ink, and an electrophotographic image former that forms an image on a recording medium using toner may be used.

In an ink jet image former, an image is formed on a recording medium, for example, by discharging ink drops from a discharge unit to the recording medium. In an ink jet image former, an image may be formed on a recording medium, for example, by discharging ink drops from a discharge unit to a transfer body, then transferring the ink drops from the transfer body to the recording medium.

An electrophotographic image former forms an image on a recording medium by performing, for example, the processes of charging, exposure, developing, and transfer. An electrophotographic image former may form an image on a recording medium by performing the processes of charging, exposure, developing, transfer to form an image on a transfer body, and transferring the image from the transfer body to the recording medium.

Examples of image former are not limited to the above-mentioned ink jet image former and the above-mentioned electrophotographic image former, and it is possible to use various image formers.

(Discharger 18)

The discharger 18 illustrated in FIG. 1 is a section to which a recording medium with an image formed is discharged, in the image forming apparatus 10. After an image is formed by the image former 16, a recording medium P transported by the transporter 14 (specifically, the transport member 14B) is discharged to the discharger 18.

(Feeding Device 12)

Figure 2:
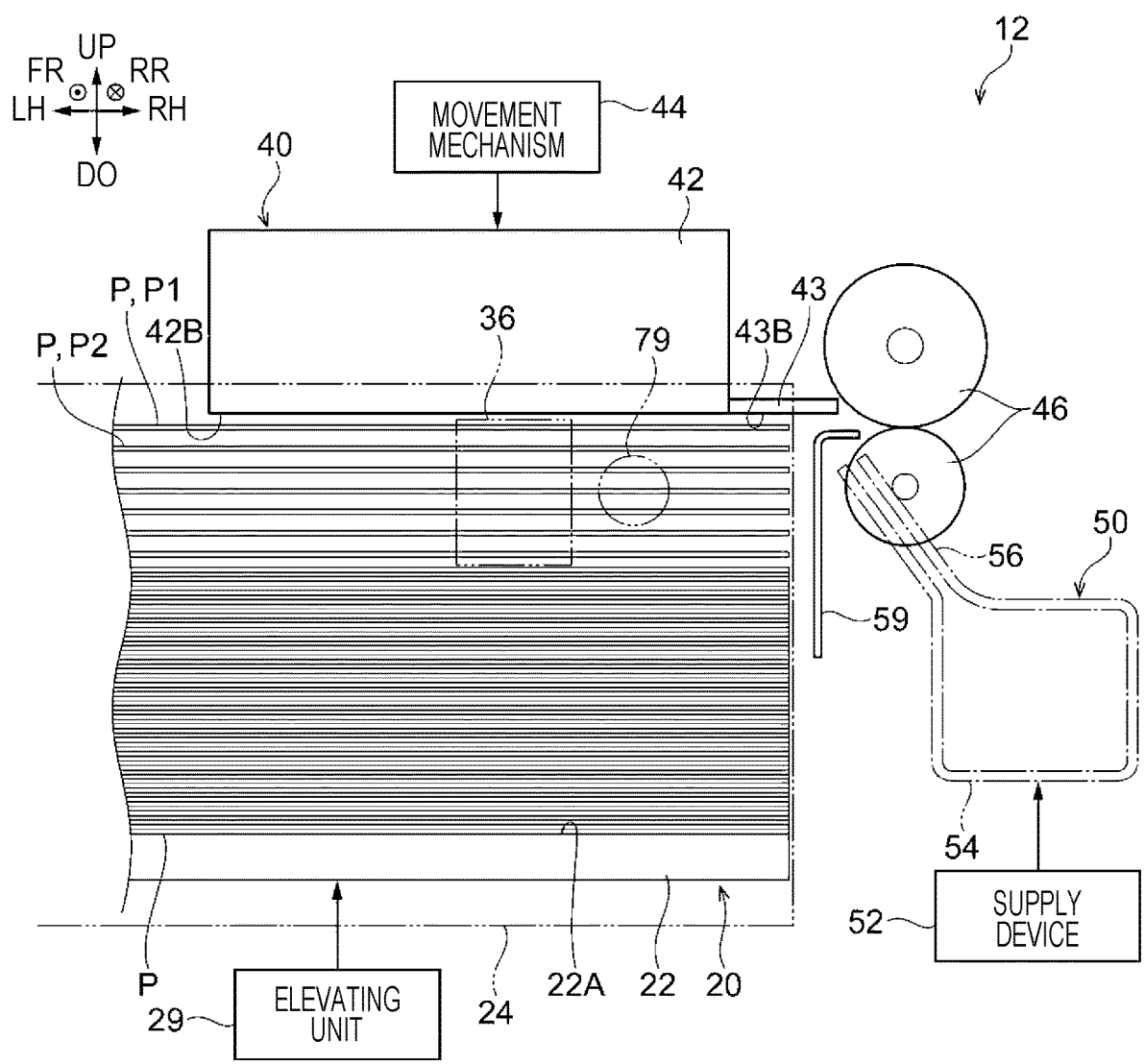
FIG. 2 is a schematic view illustrating a feeding device according to the exemplary embodiment.
Figure 3:
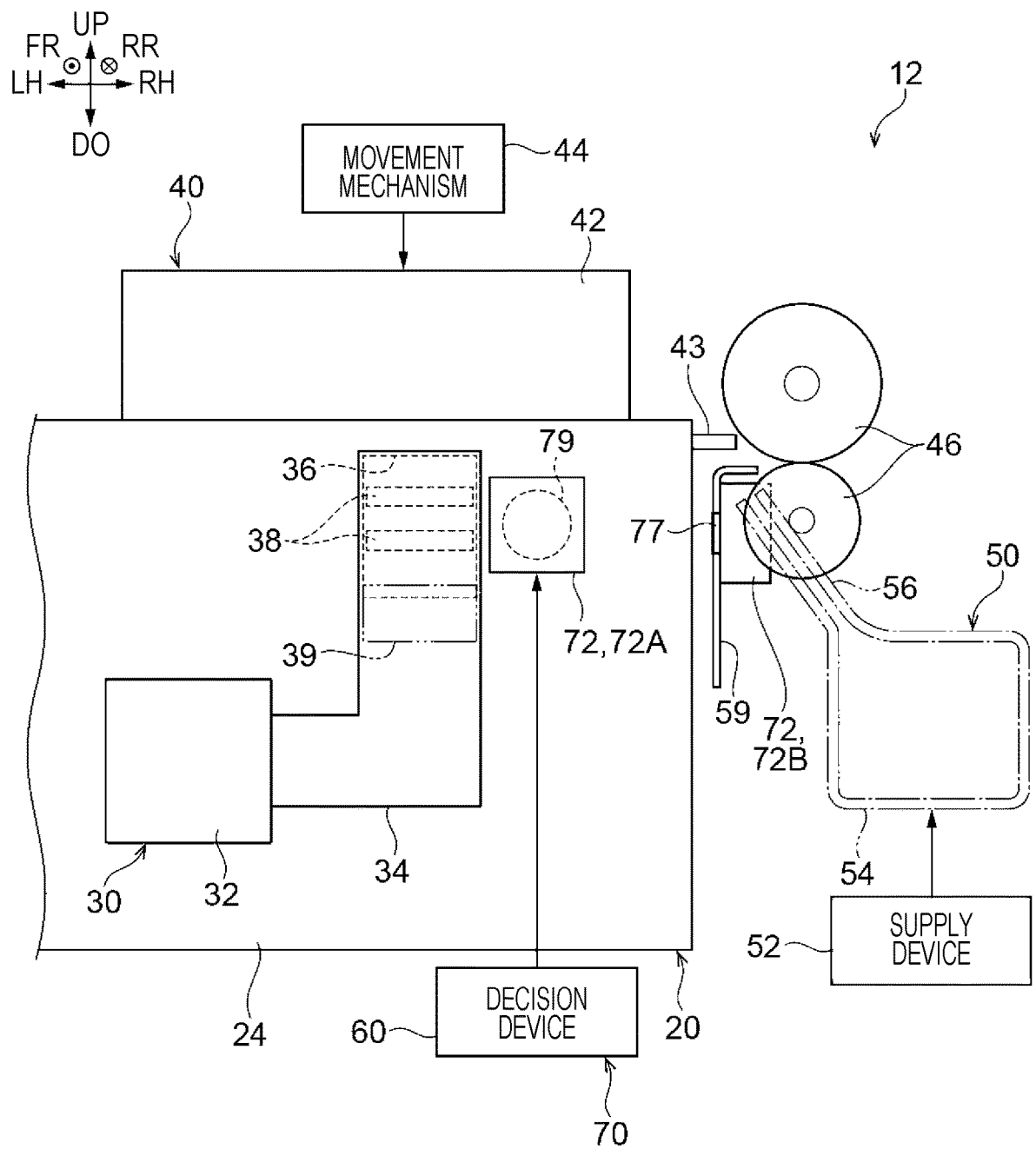
FIG. 3 is a view from the outer side of a side wall of the feeding device according to the exemplary embodiment.

The feeding device 12 illustrated in FIGS. 1, 2 and 3 is a device that feeds a recording medium P. In the exemplary embodiment, the feeding device 12 feeds a recording medium P in a predetermined feed direction (specifically, the rightward direction). Therefore, in the feeding device 12, the rightward direction is downstream in the feed direction, and the leftward direction is upstream in the feed direction. In a recording medium P fed by the feeding device 12, a downstream end in the feed direction is referred to as a front end, and an upstream end in the feed direction is referred to as a rear end. In the recording medium P, a direction (specifically, the forward-rearward direction) intersecting the feed direction is referred to as a width direction, and an end in the width direction is referred to as a lateral end.

Specifically, as illustrated in FIGS. 2 and 3, the feeding device 12 includes a storage 20, an elevating unit 29 (see FIG. 2), a supply unit 30 (see FIG. 3), a feeder 40, a separator 50, a restrictor 59, and a detector 70 (see FIG. 3). Hereinafter, each unit of the feeding device 12 will be described.

(Storage 20 and Elevating Unit 29)

The storage 20 is a component unit that stores recording media P. Specifically, as illustrated in FIG. 2, the storage 20 has a loading unit 22, and a pair of side walls 24. In FIG. 2, a side wall 24 (specifically, on the forward side) of one of the pair of side walls 24 is illustrated.

The loading unit 22 is a component unit on which recording media P are loaded. Specifically, the loading unit 22 constitutes the bottom of the storage 20, and is configurated by a loading plate (so-called a bottom plate) in which recording media P are loaded on an upper surface 22A.

The pair of side walls 24 are respectively disposed on the front side and the rear side with respect to the recording media P loaded on the loading unit 22. Each of the pair of side walls 24 is opposed to a corresponding one of a pair of lateral ends of the recording media P loaded on the loading unit 22, and configured to position the recording media P in the width direction (in other words, in the forward-rearward direction).

The storage 20 has a positioning unit (not illustrated) that positions the rear end of the recording media P loaded on the loading unit 22. The storage 20 is not limited to the above-mentioned configuration, and it is possible to use various configurations.

The elevating unit 29 is an example of an elevator unit, and provides a component unit that elevates multiple loaded recording media P so that the recording medium P placed uppermost (hereinafter referred to as the uppermost medium P1) among the multiple loaded recording media P is located at a feed height of the feeder 40. Specifically, the elevating unit 29 elevates the loading unit 22 to elevate the multiple recording media P so that the uppermost medium P1 is located at the height for feeding, and lowers the loading unit 22 to lower the multiple recording media P.

As the elevating unit 29, for example, a pulling member such as a wire and a push-up member such as an arm may be used. The pulling member elevates the recording media P, for example, by pulling the loading unit 22 upward, and lowers the recording media P by the self-weight of the recording media P and the loading unit 22. The push-up member elevates the recording media P, for example, by pushing the loading unit 22 upward from the lower side of the loading unit 22, and lowers the recording media P by the self-weight of the recording media P and the loading unit 22. The elevating unit 29 is not limited to the above-mentioned configuration, and it is possible to use various configurations.

(Supply Unit 30)

Figure 4:
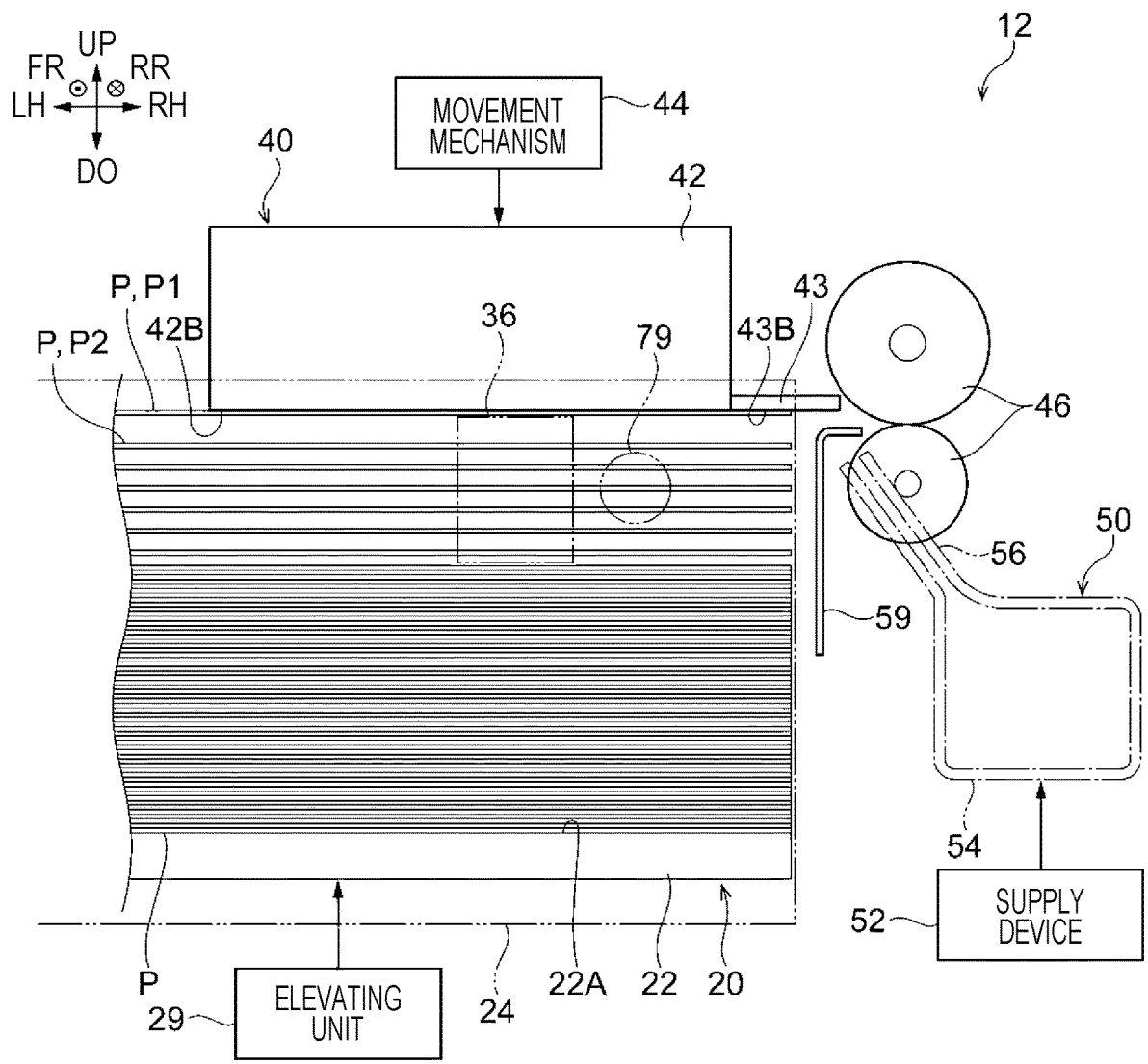
FIG. 4 is a schematic view illustrating a state in which an adsorption body adsorbs an uppermost recording medium in the feeding device illustrated in FIG. 2.
Figure 5:
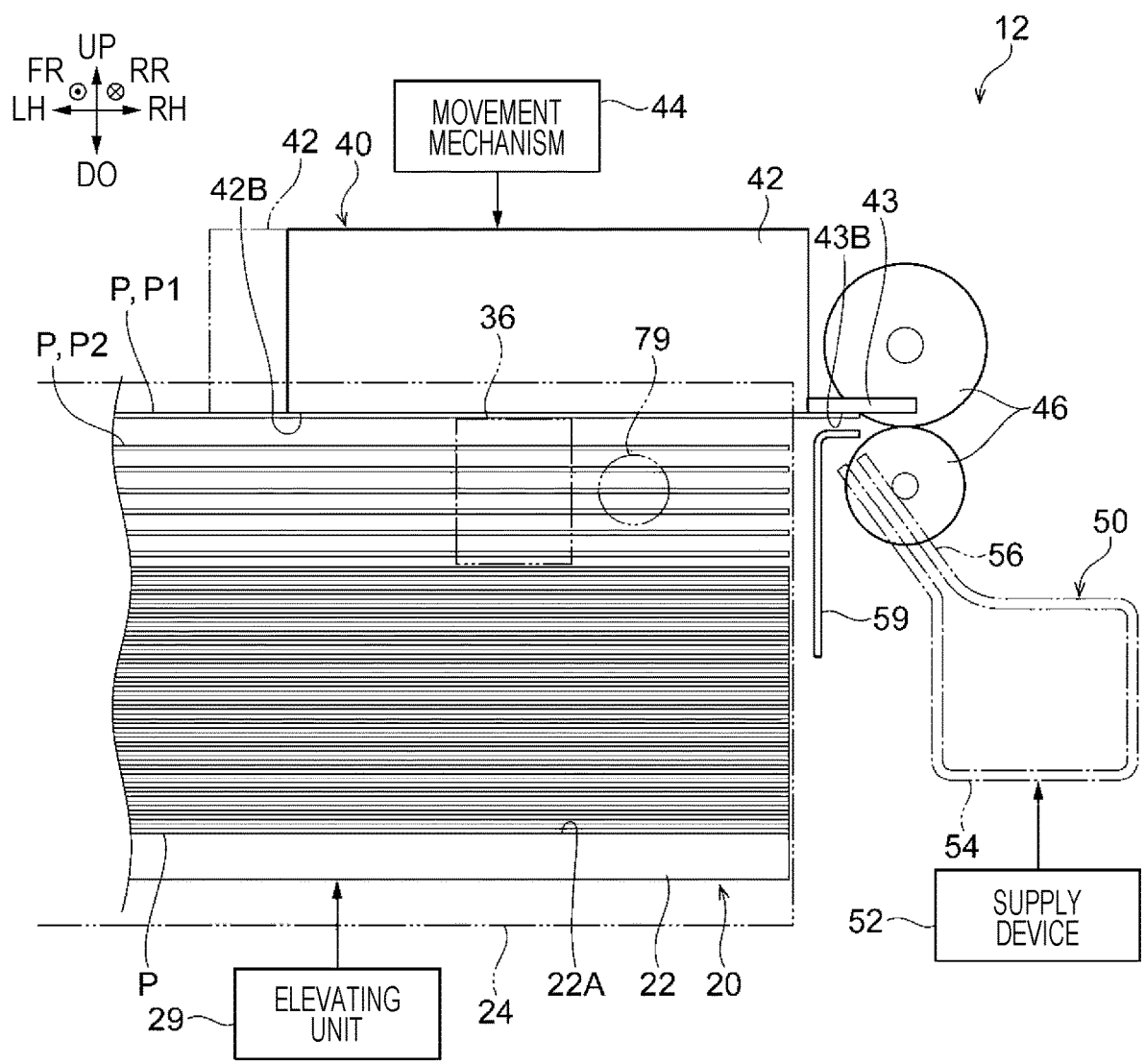
FIG. 5 is a schematic view illustrating a state in which an adsorption body has moved to a pass and receive position in the feeding device illustrated in FIG. 4.

The supply unit 30 illustrated in FIG. 3 is a component unit that supplies air into space between multiple loaded recording media P to float them. The supply unit 30 supplies air to multiple recording media P located in a predetermined range including the uppermost medium P1, among the multiple recording media P loaded on the loading unit 22. In other words, the supply unit 30 supplies air to multiple recording media P loaded on the loading unit 22, in a range from the height for feeding to a predetermined position on the lower side. The reason why the supply unit 30 supplies air to multiple loaded recording media P to float them is because the multiple recording media P are to be separated and fed one by one by supplying air into space between the multiple recording media P. FIGS. 2, 4, and 5 schematically illustrate a state in which air is supplied to an upper-side part of the multiple loaded recording media P to float them.

In the exemplary embodiment, as illustrated in FIG. 3, the supply unit 30 has a pair of air blowers 32, a pair of flow tubes 34, and a pair of supply ports 36.

The pair of air blowers 32 is a component unit that blows wind (in other words, air). The pair of air blowers 32 are mounted on the respective outer surfaces (in other words, the surfaces on opposite sides of surfaces opposed to the recording media P loaded on the loading unit 22) of the pair of side walls 24. As the air blowers 32, for example, a centrifugal fan, such as a multi-blade blower (for example, a sirocco fan), which blows air in a centrifugal direction is used. As the air blowers 32, an axial air blower that blows air in an axial direction, or another air blower may be used.

Each of the pair of flow tubes 34 forms a path through which air sent from a corresponding one of the pair of air blowers 32 flows. Each of the pair of flow tubes 34 is connected to a corresponding one of the pair of air blowers 32 at one end, and is connected to a corresponding one of the pair of supply ports 36 at the other end.

Each of the pair of supply ports 36 is a port for supplying air to the multiple recording media P loaded on the loading unit 22, and is formed in each of the pair of side walls 24. Each of the pair of supply ports 36 is open on the front-end side of the multiple recording media P loaded on the loading unit 22, and in an upper portion of the side walls 24.

The supply unit 30 supplies, from the pair of air blowers 32, air into space between the multiple recording media P loaded on the loading unit 22 from both lateral-end sides (in other words, the front side and the rear side) through the pair of flow tubes 34 and the pair of supply ports 36.

A supply direction modifier 38 is a component unit that modifies the supply direction of air into space between the multiple loaded recording media P. Specifically, the supply direction modifier 38 is comprised of a louver having, for example, multiple wing plates provided in each supply port 36. The supply direction modifier 38 is able to change the supply direction of air in at least one of the upward-downward direction and the rightward-leftward direction, for example. The supply direction modifier 38 is not limited to a louver, and another modifying device may be used.

A supply region modifier 39 is a component unit that modifies a supply region of air into space between the multiple loaded recording media P. Specifically, the supply region modifier 39 is comprised of an opening and closing plate (in other words, a shutter) that is movably provided, for example, in each supply port 36, and can modify through its movement at least one of an opening position and an opening area of the supply port 36. The supply region modifier 39 is able to change the supply region of air in at least one of the upward-downward direction and the rightward-leftward direction, for example. The supply region modifier 39 is not limited to an opening and closing plate, and another modifying device may be used.

The supply unit 30 supplies air into space between the multiple recording media P loaded on the loading unit 22 from both lateral-end sides (in other words, the front side and the rear side), however, the configuration is not limited thereto. The supply unit 30 may supply air into space between the multiple recording media P loaded on the loading unit 22 from one (in other words, one of the front side and the rear side) of both lateral ends. Alternatively, the supply unit 30 may be configured to supply air into space between the multiple loaded recording media P from at least one of the front end and the rear end of the recording media P in replacement of or in addition to supply of air from at least one of both lateral ends of the recording media P. Therefore, the supply unit 30 may be configured to supply air into space between the multiple recording media P loaded on the loading unit 22 from at least one of both lateral ends, the front end and the rear end.

(Feeder 40)

The feeder 40 illustrated in FIGS. 2, 4 and 5 is a component unit that feeds the uppermost medium P1 of the multiple loaded recording media P. The uppermost medium P1 is an example of a first medium. Specifically, as illustrated in FIG. 4, the feeder 40 adsorbs the uppermost medium P1 located at the height for feeding among the recording media P floated by the supply unit 30, and feeds it downstream (specifically, the rightward direction) as illustrated in FIG. 5. More specifically, as illustrated in FIGS. 4 and 5, the feeder 40 has an adsorption body 42, a movement mechanism 44, and a pair of feed rollers 46.

The adsorption body 42 is a component unit that causes a lower surface 42B to adsorb the uppermost medium P1 by adsorption. Specifically, the adsorption body 42 adsorbs the uppermost medium P1 at a position rearward of the front end of the uppermost medium P1 located at the height for feeding. Hereinafter the position of the uppermost medium P1, at which it is adsorbed by the adsorption body 42, is referred to as the adsorption position. In the adsorption body 42, an extending section 43 is formed which extends downstream (specifically, the rightward direction) in the feed direction. The uppermost medium P1 is adsorbed by the lower surface 42B of the adsorption body 42, thereby causing the front end of the uppermost medium P1 to be pressed against the lower surface 43B of the extending section 43.

The movement mechanism 44 is a mechanism that moves the adsorption body 42 in the rightward-leftward direction (in other words, the downstream direction and the upstream direction in the feed direction) between a suction position (the position indicated in FIG. 2, and the position indicated by a dashed-two dotted line in FIG. 5) and a pass and receive position (the position indicated by a solid line in FIG. 5).

Specifically, the movement mechanism 44 is constructed using a publicly known mechanism such as a motor, a gear, a rack, a pinion and a belt drive. Note that the movement mechanism 44 is not limited to a specific mechanism, and it is possible to use various configurations.

The pair of feed rollers 46 provide a feed member that feeds a recording medium P to the image former 16. The pair of feed rollers 46 are disposed downstream (specifically, at the above-mentioned pass and receive position) in the feed direction with respect to the adsorption body 42 so as to be in contact with each other in the upward-downward direction. Note that the feed member is not limited to the pair of feed rollers 46. The feed member may be a feed member such as an annular belt or a drum, and it is possible to use various feed members.

In the feeder 40, the adsorption body 42 causes the lower surface 42B to adsorb the uppermost medium P1 by suction at the suction position (the position indicated in FIG. 2), and the adsorption body 42 is moved to the pass and receive position (the position indicated by a solid line in FIG. 5) by the movement mechanism 44. The recording medium P is passed at the pass and receive position from the adsorption body 42 to the pair of feed rollers 46, which feed the recording medium P to the image former 16.

Note that the feeder 40 is not limited to the above-mentioned configuration. For example, in replacement of the adsorption body 42, the feeder 40 may adopt a configuration using a feed member such as a belt and a roller. In a configuration using an annular belt, for example, a suction unit may be provided on the inner periphery of the belt, the suction unit causing the outer peripheral surface of the belt to adsorb a recording medium P by suction.

(Separator 50 and Restrictor 59)

The separator 50 illustrated in FIG. 4 is a component unit that supplies air to the recording medium P (hereinafter referred to as the subsequent medium P2) placed immediately below the uppermost medium P1 adsorbed by the adsorption body 42 to separate the uppermost medium P1 and the subsequent medium P2. The subsequent medium P2 is the recording medium P to be fed subsequent to the uppermost medium P1, that is, the recording medium P disposed adjacent to and below the uppermost medium P1. Specifically, as illustrated in FIG. 4, the separator 50 has, for example, a supply device 52, a flow tube 54, and a nozzle 56.

The supply device 52 is a device that supplies air to the flow tube 54. Specifically, as the supply device 52, for example, an air compressor that supplies pressurized air to the flow tube 54 is used. The supply device 52 is not limited to an air compressor, and another supply device may be used.

The flow tube 54 forms a path through which the air sent by the supply device 52 flows. The flow tube 54 extends in a width direction (that is, the forward-rearward direction) of the recording media P, and allows air to flow in the width direction.

Multiple nozzles 56 are provided in the width direction (that is, the forward-rearward direction) of the recording media P with respect to the flow tube 54. Each of the multiple nozzles 56 extends from the flow tube 54 to the adsorption body 42 (specifically, the extending section 43) side (in other words, diagonal upper left side).

In the separator 50, the adsorption body 42 located at the suction position (the position illustrated in FIG. 2) discharges air to the extending section 43 through the nozzle 56. The air hitting the extending section 43 is supplied between the uppermost medium P1 and the subsequent medium P2. Thus, the uppermost medium P1 and the subsequent medium P2 are separated, and the subsequent medium P2 falls.

In this manner, the air through the nozzle 56 is supplied between the uppermost medium P1 and the subsequent medium P2 through the extending section 43, thus extending section 43 may be regarded as an element of the separator 50. The separator 50 may be configured to directly supply air into space between the uppermost medium P1 and the subsequent medium P2 not through the extending section 43.

The restrictor 59 illustrated in FIG. 4 is a component unit that restricts the movement of the subsequent medium P2 downstream in the feed direction. Specifically, the restrictor 59 is comprised of a restriction wall disposed between the storage 20 and the pair of feed rollers 46 (specifically, the feed roller 46 disposed on the lower side) in a side view. The restrictor 59 is formed in a plate shape extending in the upward-downward direction in a side view.

The restrictor 59 comes into contact with the subsequent medium P2 fed downstream in the feed direction along with the uppermost medium P1 due to movement of the adsorption body 42 to the pass and receive position, thereby causing the subsequent medium P2 to fall from the uppermost medium P1 to restrict the movement of the subsequent medium P2 downstream in the feed direction. Note that the restrictor 59 is not limited to the above-mentioned configuration, and another restriction device may be used.

(Detector 70)

The detector 70 illustrated in FIG. 3 is a component unit that detects a curved state (hereinafter may be referred to as a media curved state) of the uppermost medium P1 and following media P including the subsequent medium P2. The subsequent medium P2 is an example of a second medium. The following media P including the subsequent medium P2 are recording media P that are the subsequent medium P2 and at least one of the recording media P placed below the subsequent medium P2. In the exemplary embodiment, the detector 70 detects a curved state of multiple (for example, 10) recording media P including the uppermost medium P1, and the subsequent medium P2.

The media curved state includes, for example, a curved state (see FIG. 6) in which the uppermost medium P1 and following media P including the subsequent medium P2 are convex downward when seen from the downstream side in the feed direction (in other words, the right side), and a curved state (see FIG. 7) in which the uppermost medium P1 and following media P including the subsequent medium P2 are convex upward when seen from the downstream side in the feed direction (in other words, the right side). In addition, the media curved state includes, for example, a curved state (see FIG. 8) in which the uppermost medium P1 and following media P including the subsequent medium P2 are convex downward when seen from the lateral side (in other words, the front side), and a curved state (see FIG. 9) in which the uppermost medium P1 and following media P including the subsequent medium P2 are convex upward when seen from the lateral side (in other words, the front side).

In the exemplary embodiment, the detector 70 detects, as the media curved state, a curve direction indicating whether the curve is convex upward or downward, a curve height indicating the height difference between an uppermost portion and a lowermost portion in a recording medium P, and a curve length indicating the distance between the uppermost portion and the lowermost portion in the recording medium P in a feed direction or a width direction.

Furthermore, the detector 70 detects the media curved state after multiple recording media P are elevated by the elevating unit 29 and before the uppermost medium P1 is fed by the feeder 40. Specifically, the detector 70 detects the media curved state after multiple recording media P are elevated by the elevating unit 29 and before air is supplied by the supply unit 30. In addition, the detector 70 repeats detection of a media curved state while a feeding operation for the recording media P is continued by the feeder 40. Specifically, as illustrated in FIG. 3, the detector 70 has an image capture unit 72, a detector 73 (see FIG. 12), and a decision device 60.

The image capture unit 72 is a component unit that captures an image of the uppermost medium P1 and following media P including the subsequent medium P2. Specifically, the image capture unit 72 is comprised of a camera including, for example, an optical element such as a lens, and an image capture device such as a complementary metal oxide semiconductor (CMOS) image sensor. The image capture unit 72 is not limited to the above-mentioned camera, and may be a camera including a charge coupled device (CCD) or another device as an image capture device, and another image capture unit may be used.

In the exemplary embodiment, three image capture units 72 are provided. As illustrated in FIG. 3, the detector 70 includes a pair of image capture units 72A, and an image capture unit 72B as the three image capture units 72. In FIG. 2, FIG. 4, FIG. 5, the image capture units 72A, 72B are not illustrated.

The pair of image capture units 72A are each attached to the outer surface of a corresponding one of the pair of side walls 24. The pair of image capture units 72A capture an image of the uppermost medium P1 and following media P including the subsequent medium P2 through respective openings 79 formed on the pair of side walls 24 from one side (specifically, the front side) and the other side (specifically, the rear side) in the width direction. In this manner, the pair of image capture units 72A each capture an image of the uppermost medium P1 and following media P including the subsequent medium P2 from the lateral side of the recording media P. FIG. 3 illustrates only one of the pair of image capture units 72A, which is the image capture unit 72A attached to the outer surface of the side wall 24 on the front side.

Figure 10:
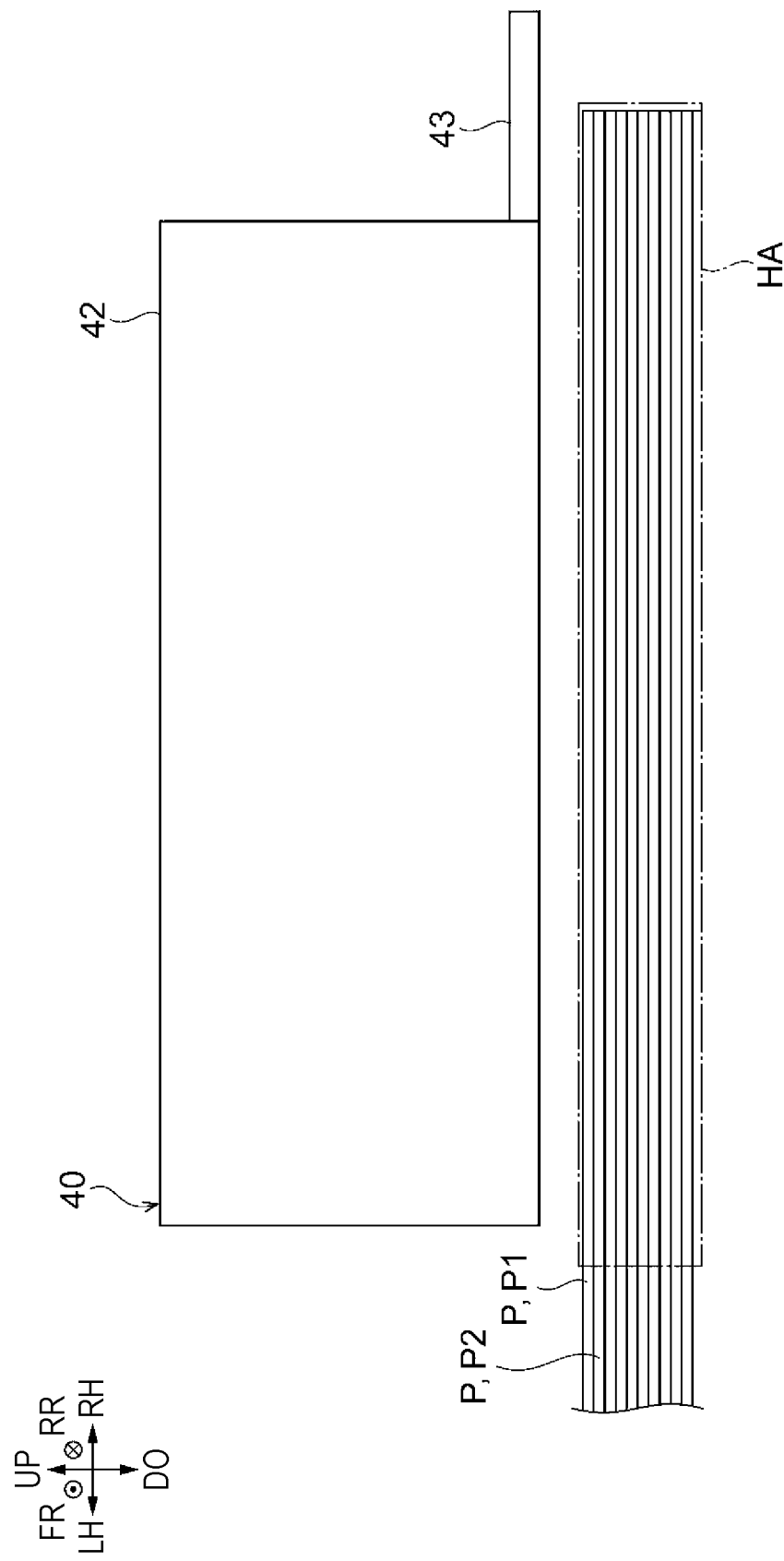
FIG. 10 is a schematic view illustrating an image capture range of an image capture unit that captures an image from a lateral side in a feeding device according to the exemplary embodiment.

The pair of image capture units 72A each capture an image of the uppermost medium P1 and following media P including the subsequent medium P2 from the lateral side (specifically, the front side and the rear side) of the recording media P in an image capture range (specifically, the image capture range indicated by a dashed-dotted line HA in FIG. 10) including an area from the adsorption position of the feeder 40 (specifically, the adsorption body 42) to the front end of the recording media P.

The image capture unit 72B is disposed downstream (specifically, on the right side) in the feed direction with respect to multiple recording media P loaded on the loading unit 22. The image capture unit 72B captures an image of the uppermost medium P1 and following media P including the subsequent medium P2 from the downstream side in the feed direction in a range (specifically, the image capture range indicated by a dashed-dotted line HB in FIG. 11) from one end to the other end in the width direction. Specifically, the image capture unit 72B is attached, for example, to the surface of the restrictor 59 downstream (specifically, on the right side) in the feed direction. The image capture unit 72B captures an image of the uppermost medium P1 and following media P including the subsequent medium P2 from the downstream side (specifically, on the right side) in the feed direction through an opening 77 formed on the restrictor 59.

The image capture unit 72 continues an image capture operation in the image capture range while a feeding operation for the recording media P is continued by the feeder 40. The image capture unit 72 captures the images of recording media P continuously for multiple times. The image capture unit 72 has an illumination unit (not illustrated) that illuminates the image capture range.

The detector 73 (see FIG. 12) is a component unit that detects the height of the uppermost medium P1 relative to the reference height. Specifically, the detector 73 detects the height at a central portion of the uppermost medium P1 in the width direction and at the front end thereof. As the detector 73, for example, a contact detector that detects the height of the uppermost medium P1 by coming into contact with the upper surface thereof, and/or a non-contact detector (specifically, a reflective or transmissive optical sensor) that detects the height of the uppermost medium P1 are used. Note that the reference height is an arbitrarily set height, and may be the height of a specific part in the device, or may be a virtually set height.

Figure 12:
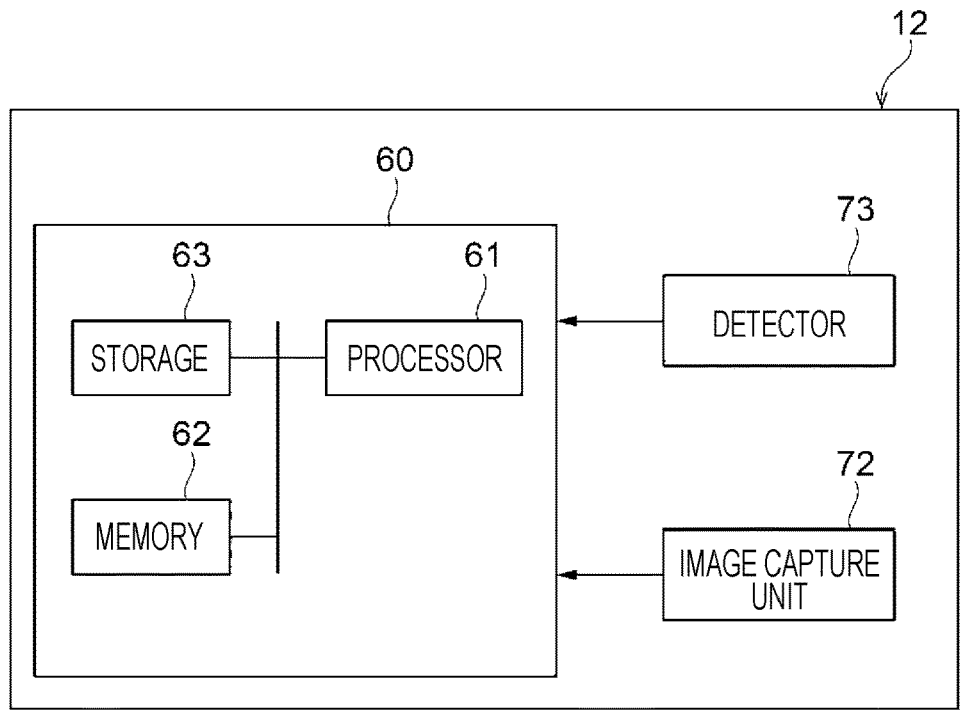
FIG. 12 is a block diagram illustrating an example of a decision device in the feeding device according to the exemplary embodiment.

The decision device 60 illustrated in FIGS. 3 and 12 is a device that makes various types of decision (including identification) in the feeding device 12. Specifically, as illustrated in FIG. 12, the decision device 60 has a processor 61, a memory 62, and a storage 63.

As the processor 61, for example, a central processing unit (CPU), which is a general-purpose processor, is used. The storage 63 stores various programs including an execution program 63A (see FIG. 13), and various types of data. Specifically, the storage 63 is implemented by a recording device, such as a hard disk drive (HDD), a solid state drive (SSD) and a flash memory.

The memory 62 provides a work area for the processor 61 to execute various programs, and temporarily stores various programs or various data when the processor 61 executes processing. The processor 61 reads various programs including the execution program 63A from the storage 63 into the memory 62, and executes the programs using the memory 62 as a work area.

Figure 13:
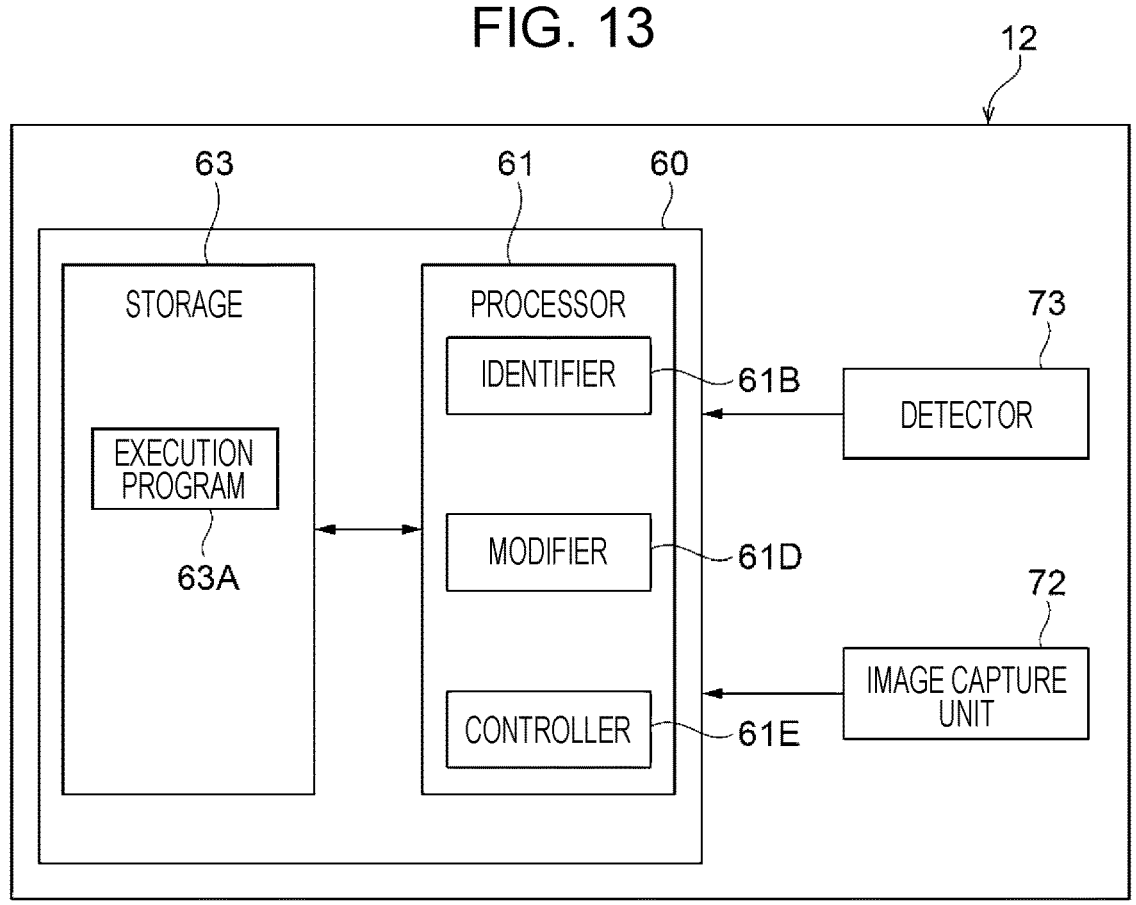
FIG. 13 is a block diagram illustrating an example of a functional configuration of a processor of the decision device in the feeding device according to the exemplary embodiment.

In the decision device 60, the processor 61 implements various functions by executing the execution program 63A. Hereinafter, the functional configuration implemented by the cooperation between the processor 61 as a hardware resource and the execution program 63A as a software resource will be described. FIG. 13 is a block diagram illustrating the functional configuration of the processor 61.

As illustrated in FIG. 13, in the decision device 60, the processor 61 functions as an identifier 61B, a modifier 61D, and a controller 61E by executing the execution program 63A.

The identifier 61B identifies a media curved state based on an image captured by the image capture unit 72. Specifically, the identifier 61B identifies a media curved state (see FIGS. 6 and 7) occurred in the width direction at the front end of the uppermost medium P1 and following media P including the subsequent medium P2 based on an image captured by the image capture unit 72B.

More specifically, the identifier 61B identifies the media curved state as follows. First, the identifier 61B extracts, from the image captured by the image capture unit 72B, the height of a highest portion relative to the reference height, the height of a lowest portion relative to the reference height, and the height of a widthwise center point relative to the reference height at the front end of each of the uppermost medium P1 and following media P including the subsequent medium P2. When the height of a highest portion or the height of a lowest portion matches the height of a widthwise center point in a range of predetermined error, the identifier 61B determines that the media curved state has occurred, and identifies the curve direction, the curve height, and the curve length. Specifically, when the height of a highest portion matches the height of a widthwise center point in a range of predetermined error, the identifier 61B identifies convex upward direction as the curve direction, the height difference between the highest portion and the lowest portion as the curve height, and the distance between the highest portion and the lowest portion in the width direction as the curve length (see FIG. 7).

In contrast, when the height of a lowest portion matches the height of a widthwise center point in a range of predetermined error, the identifier 61B identifies convex downward direction as the curve direction, the height difference between the highest portion and the lowest portion as the curve height, and the distance between the highest portion and the lowest portion in the width direction as the curve length (see FIG. 6). As the height of a widthwise center point, a result of detection of the detector 73 can be used. When the position of a highest portion or a lowest portion is at a widthwise center point, the identifier 61B determines that the media curved state has occurred, and identifies the curve direction, the curve height, and the curve length. In other words, a media curved state may be identified by the positional relationship between the highest portion, the lowest portion, and the widthwise center point.

When the height of a highest portion or the height of a lowest portion does not match the height of a widthwise center point exceeding a range of error, the identifier 61B determines that no media curved state has occurred, and does not identify the media curved state.

Figure 8:
FIG. 8 is a pattern diagram illustrating a curved state indicating convex downward, occurred in a feed direction at a front end of a recording medium.
Figure 9:
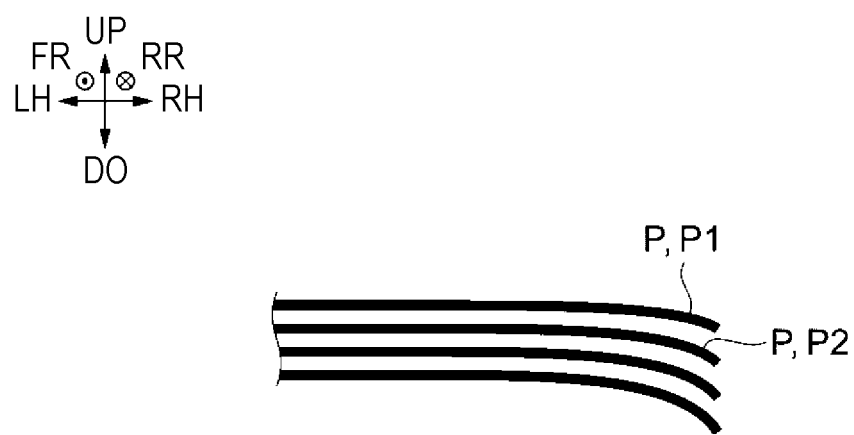
FIG. 9 is a pattern diagram illustrating a curved state indicating convex upward, occurred in a feed direction at a front end of a recording medium.

The identifier 61B identifies a media curved state occurred in a feed direction at the front end of the uppermost medium P1 and following media P including the subsequent medium P2 based on an image captured by the image capture unit 72A (see FIGS. 8 and 9). Specifically, the identifier 61B identifies a media curved state occurred in a feed direction at the front end of each of a pair of lateral ends of the uppermost medium P1 and following media P including the subsequent medium P2 based on an image captured by each of the pair of image capture units 72A.

More specifically, the identifier 61B identifies the media curved state as follows. First, the identifier 61B extracts, from an image captured by each of the pair of image capture units 72A, the height of a highest portion relative to the reference height, the height of a lowest portion relative to the reference height, and the height of the front end relative to the reference height at the lateral end of each of the uppermost medium P1 and following media P including the subsequent medium P2. When the height of a highest portion or the height of a lowest portion matches the height of the front end in a range of predetermined error, the identifier 61B determines that the media curved state has occurred, and identifies the curve direction, the curve height, and the curve length. Specifically, when the height of a highest portion matches the height of the front end in a range of predetermined error, the identifier 61 B identifies convex downward direction as the curve direction, the height difference between the highest portion and the lowest portion as the curve height, and the distance between the highest portion and the lowest portion in the width direction as the curve length (see FIG. 8).

In contrast, when the height of a highest portion matches the height of the front end in a range of predetermined error, the identifier 61 B identifies convex upward direction as the curve direction, the height difference between the highest portion and the lowest portion as the curve height, and the distance between the highest portion and the lowest portion in the width direction as the curve length (see FIG. 9). As the height of the front end, a result of detection of the detector 73 can be used. When the position of a highest portion or a lowest portion is at the front end, the identifier 61B determines that the media curved state has occurred, and identifies the curve direction, the curve height, and the curve length. In other words, a media curved state may be identified by the positional relationship between the highest portion, the lowest portion, and the front end.

When the height of a highest portion or the height of a lowest portion does not match the height of the front end exceeding a range of error, the identifier 61B determines that no media curved state has occurred, and does not identify the media curved state.

The modifier 61D modifies the conditions related to the feeding operation of the feeder 40 based on the media curved state detected by the detector 70. Specifically, the modifier 61D modifies the conditions related to the feeding operation of the feeder 40 based on the media curved state identified by the identifier 61B before the uppermost medium P1 is fed by the feeder 40. Alternatively, the modifier 61D can modify the conditions each time a single pieces or multiple pieces of the uppermost medium P1 and following media P including the subsequent medium P2 are fed.

The conditions include the volume, temperature, humidity, supply direction and supply region of the air supplied to space between multiple recording media P in the supply unit 30. In addition, the conditions include the volume, temperature, humidity, supply direction and supply region of the air supplied to the subsequent medium P2 in the separator 50. Furthermore, the conditions include the position of the restrictor 59 in the upward-downward direction. In addition, the conditions include the height for feeding by the elevating unit 29. Furthermore, the conditions include the feeding distance set by the adsorption body 42, in other words, the suction position (the position illustrated in FIG. 2) of the adsorption body 42 and the pass and receive position (the position indicated by a solid line in FIG. 5).

The controller 61E controls the operation of each unit of the feeding device 12 based on the conditions modified by the modifier 61D. When the result of detection of a media curved state detected by the detector 70 does not meet the required conditions allowing execution of the feeding operation for the recording media P by the feeder 40, the controller 61E performs control to stop the feeding operation for the recording media P over the feeder 40. Thus, the feeder 40 stops execution of the feeding operation for the recording media P. In this manner, the decision device 60 has a function of controlling the operation of each unit of the feeding device 12, thus may be called a control device.

In the exemplary embodiment, of the functional units of the identifier 61B, the modifier 61D, and the controller 61E, the identifier 61B implements the functional unit of the detector 70. For example, the modifier 61D, and the controller 61E may be comprised of a device other than the decision device 60. Furthermore, the identifier 61B, the modifier 61D, and the controller 61E may be comprised of separate devices.

The detector 70 is not limited to the above-mentioned configuration. For example, in replacement of the image capture unit 72, the detector 70 may have a radiation unit that radiates vertically extending strip-shaped light to multiple recording media P, and a light reception unit that receives light, so that the media curved state is detected based on the height of a portion where the light is shielded by the recording media P. Furthermore, in a configuration having the radiation unit and the light reception unit, the media curved state may be detected based on the height of a portion where the light is reflected or absorbed by the recording medium P. As the radiation unit, for example, a light emission unit may be used, in which light emitting devices are disposed in the upward-downward direction in a row or staggered manner, or are disposed in two-dimensional form. As the light reception unit, a light receiving unit may be used, in which for example, light receiving devices are disposed in the upward-downward direction in a row or staggered manner, or are disposed in two-dimensional form.

In the exemplary embodiment, the detector 70 has been described as a device that detects a media curved state, however, the configuration is not limited thereto. In addition to a media curved state, the detector 70 may detect an inclination (hereinafter referred to as a media inclination) of the uppermost medium P1 and following media P including the subsequent medium P2.

Here, the inclination is a state in which a recording medium P has a planar slope, and a curved state is a state in which a recording medium P has a curved slope. According to the above exemplary embodiment, the slope of a recording medium P is detectable without distinction between a planar slope and a curved slope, thus in addition to a media curved state, a media inclination can be detected without distinction. Therefore, in other words, the detector 70 can be regarded as a component unit that detects both a media curved state and a media inclination. The detector 70 may detect a media curved state and a media inclination distinctively by extracting the height of each relevant portion from an image captured by the image capture units 72. Furthermore, the detector 70 may be configured to detect only one of a media curved state and a media inclination.

Effects According to Exemplary Embodiment

Next, the effects according to the exemplary embodiment will be described.

In the exemplary embodiment, the detector 70 detects a curved state of the uppermost medium P1 and following media P including the subsequent medium P2, and the modifier 61D modifies the conditions related to the feeding operation of the feeder 40 based on the curved state detected by the detector 70.

Thus, an occurrence of a feed failure in the following media P including the subsequent medium P2 is reduced, as compared to when only the curved state of the uppermost medium P1 is detected in the feeding device 12 including the feeder 40 that feeds the uppermost medium P1 of multiple loaded recording media P, and the conditions related to the feeding operation of the feeder 40 are modified based on the curved state.

Therefore, in the image forming apparatus 10, an image can be formed on a recording medium P while reducing the occurrence of a feed failure in the following media P including the subsequent medium P2, as compared to when only the curved state of the uppermost medium P1 is detected, and the conditions related to the feeding operation of the feeder 40 are modified based on the curved state.

In the exemplary embodiment, the image capture unit 72 captures an image of the uppermost medium P1 and following media P including the subsequent medium P2, and the identifier 61B identifies a media curved state based on the image captured by the image capture unit 72.

Thus, the accuracy of identification is increased, as compared to when the height of each relevant portion of a recording medium P is detected by multiple sensors to identify a curved state.

Figure 11:
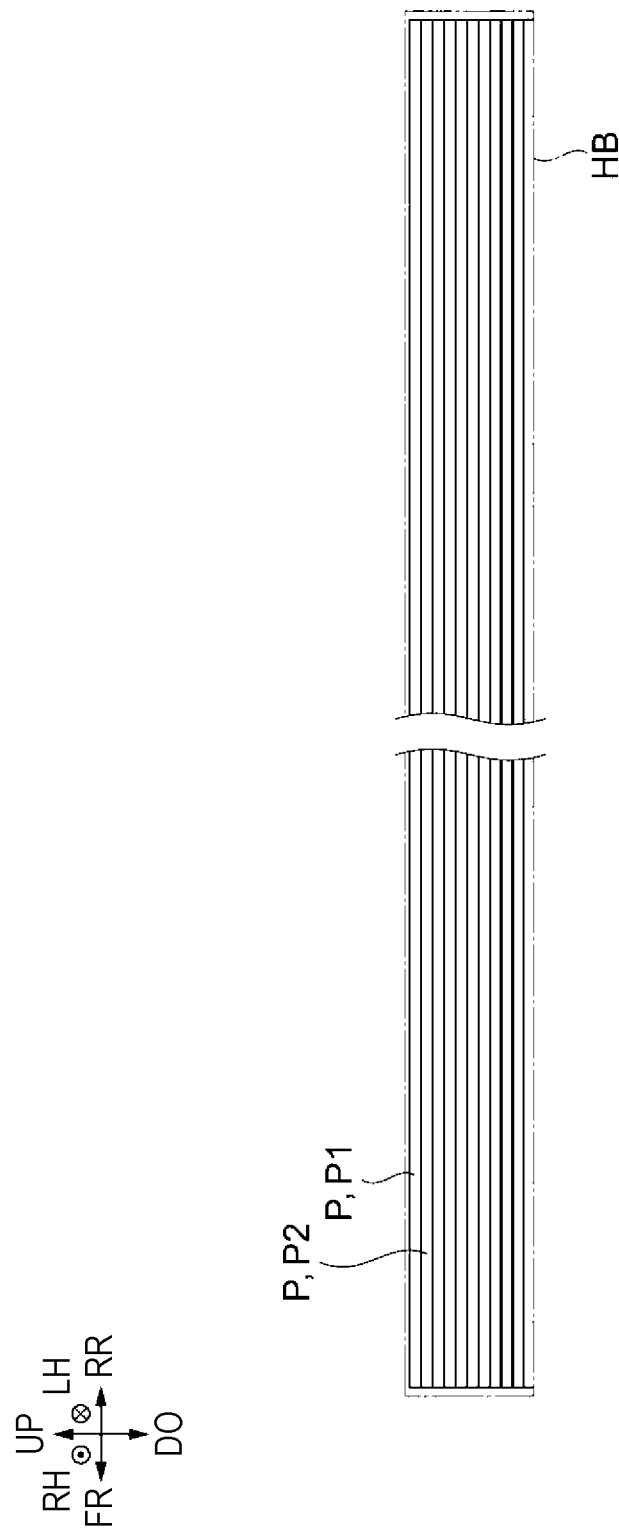
FIG. 11 is a schematic view illustrating an image capture range of an image capture unit that captures an image downstream in a feed direction in the feeding device according to the exemplary embodiment.

In the exemplary embodiment, specifically, the image capture unit 72B captures an image of the uppermost medium P1 and following media P including the subsequent medium P2 from the downstream side in the feed direction in a range (specifically, the image capture range indicated by a dashed-dotted line HB in FIG. 11) from one end to the other end in the width direction, and the identifier 61B identifies a media curved state occurred in the width direction at the front end of the uppermost medium P1 and following media P including the subsequent medium P2 based on the image captured by the image capture unit 72B.

Thus, a media curved state occurred in the width direction at the front end of the uppermost medium P1 and following media P including the subsequent medium P2 is identified with high accuracy, as compared to when the image capture unit 72B captures an image of the uppermost medium P1 and following media P including the subsequent medium P2 in a partial range in the width direction.

In the exemplary embodiment, the image capture unit 72A captures an image of the uppermost medium P1 and following media P including the subsequent medium P2 from the lateral side of the recording media P in an image capture range (specifically, the image capture range indicated by a dashed-dotted line HA in FIG. 10) including an area from the adsorption position of the feeder 40 (specifically, the adsorption body 42) to the front end of the recording media P, and the identifier 61B identifies a media curved state occurred in a feed direction at the front end of the uppermost medium P1 and following media P including the subsequent medium P2 based on the image captured by the image capture unit 72A.

Thus, a media curved state occurred in a feed direction at the front end of the uppermost medium P1 and following media P including the subsequent medium P2 is identified with high accuracy, as compared to when the image capture unit 72A captures an image of the uppermost medium P1 and following media P including the subsequent medium P2 in an image capture range not including an area from the adsorption position of the feeder 40 to the front end of the recording media P.

In the exemplary embodiment, the detector 70 detects a media curved state after multiple recording media P are elevated by the elevating unit 29 and before the uppermost medium P1 is fed by the feeder 40.

The posture of the recording media P may change when the multiple recording media P are elevated by the elevating unit 29, and in the case (hereinafter referred to as case A) where a media curved state is detected before the multiple recording media P are elevated by the elevating unit 29, the conditions are modified based on a result of detection before the change of the posture, thus a feed failure in the uppermost medium P1 may occur.

In contrast, in the exemplary embodiment, as described above, the detector 70 detects a media curved state after multiple recording media P are elevated by the elevating unit 29 and before the uppermost medium P1 is fed by the feeder 40, thus the occurrence of a feed failure in the uppermost medium P1 is reduced than in the case A.

In the exemplary embodiment, the detector 70 detects a media curved state after multiple recording media P are elevated by the elevating unit 29 and before air is supplied by the supply unit 30.

Here, in the case (hereinafter referred to as case B) where a media curved state is detected after air is supplied by the supply unit 30, the detection may be performed with an unstable state of the posture of the recording media P due to the air supply, and the conditions are modified based on the result of the detection, thus a feed failure in the uppermost medium P1 may occur.

In contrast, in the exemplary embodiment, the detector 70 detects a media curved state after multiple recording media P are elevated by the elevating unit 29 and before air is supplied by the supply unit 30, thus the occurrence of a feed failure in the uppermost medium P1 is reduced than in the case B.

In the exemplary embodiment, the detector 70 repeats detection of a media curved state while a feeding operation for the recording media P is continued by the feeder 40.

In this configuration, even when the posture of the recording media P changes while a feeding operation by the feeder 40 is continued, a media curved state is detected in the recording medium P which has changed, and the conditions are changeable based on the media curved state, thus the occurrence of a feed failure in the recording media P is reduced, as compared to when an operation of detecting a media curved state is stopped while a feeding operation for the recording media P is continued by the feeder 40.

In the exemplary embodiment, the detector 70 detects, as the media curved state, a curve direction indicating whether the curve is convex upward or downward, a curve height indicating the height difference between an uppermost portion and a lowermost portion in a recording medium P, and a curve length indicating the distance between the uppermost portion and the lowermost portion in the recording medium P in a feed direction or a width direction. Thus, the conditions related to the feeding operation of the feeder 40 can be changed based on the curve direction, the curve height, and the curve length. Therefore, the conditions can be modified (in other words, can be set) precisely, as compared to when only the curve direction is detected as the media curved state.

In the exemplary embodiment, when the result of detection of a media curved state detected by the detector 70 does not meet the required conditions allowing execution of the feeding operation for the recording media P by the feeder 40, the feeder 40 stops execution of the feeding operation for the recording media P.

Thus, even when the result of detection of a media curved state detected by the detector 70 does not meet the required conditions allowing execution of the feeding operation for the recording media P by the feeder 40, the occurrence of a feed failure in the recording media P is reduced, as compared to when the feeder 40 executes the feeding operation for the recording media P.

(Modifications of Identifier 61B)

The identifier 61B identifies a media curved state (see FIGS. 6 and 7) occurred in the width direction at the front end of the uppermost medium P1 and following media P including the subsequent medium P2 based on the image captured by the image capture unit 72B, however, the configuration is not limited thereto. For example, the identifier 61B may identify at least one of a media curved state (see FIGS. 6 and 7) and a media inclination occurred in the width direction at the front end of the uppermost medium P1 and following media P including the subsequent medium P2 based on the image captured by the image capture unit 72A, and the height detected by the detector 73. Specifically, for example, the identifier 61B first extracts, from an image captured by each of the pair of image capture units 72A, the height of the front end at each of a pair of lateral ends of each of the uppermost medium P1 and following media P including the subsequent medium P2. When the height of each of a pair of lateral ends is higher than the height at the widthwise center detected by the detector 73, the identifier 61B determines that a curved state indicating convex downward or an inclination has occurred, and identifies a media curved state or a media inclination. In addition, when the height of each of a pair of lateral ends is lower than the height at the widthwise center detected by the detector 73, the identifier 61B determines that a curved state indicating convex upward or an inclination has occurred, and identifies a media curved state or a media inclination. In this manner, the identifier 61B may identify at least one of a media curved state and a media inclination based on the image captured by the image capture unit 72, and the height detected by the detector 73.

With this configuration, at least one of a media curved state and a media inclination can be identified using the height of the recording media P not included in the image capture range of the image capture unit 72, thus, the accuracy of identification is increased, as compared to when at least one of a media curved state and a media inclination is identified based on only the image captured by the image capture unit 72.

In this modification, at least one of a media curved state and a media inclination occurred in the width direction at the front end of the recording media P is identified using the image captured by the image capture units 72A, thus, when a media curved state (see FIGS. 8 and 9) and a media inclination occurred in the feed direction at the front end of the recording media P is identified, the identification is made possible using common captured images. Thus, the number of processes of specific processing is reduced, as compared to when at least one of a media curved state and a media inclination occurred in the width direction at the front end of the recording media P is identified based on an image captured from the downstream side in the feed direction by the image capture unit 72B. In the exemplary embodiment, a configuration may be adopted in which the image capture unit 72B is not provided.

(Other Modifications)

In the exemplary embodiment, the detector 70 detects at least one of a media curved state and a media inclination after multiple recording media P are elevated by the elevating unit 29 and before the uppermost medium P1 is fed by the feeder 40, however, the configuration is not limited thereto. For example, the detector 70 may be configured to detect at least one of a media curved state and a media inclination before multiple recording media P are elevated by the elevating unit 29.

In the exemplary embodiment, the detector 70 detects a media curved state after multiple recording media P are elevated by the elevating unit 29 and before air is supplied by the supply unit 30, however, the configuration is not limited thereto. For example, the detector 70 may be configured to detect at least one of a media curved state and a media inclination after air is supplied by the supply unit 30.

In the exemplary embodiment, the detector 70 repeats detection of at least one of a media curved state and a media inclination while a feeding operation for the recording media P is continued by the feeder 40, however, the configuration is not limited thereto. For example, the detector 70 may be configured to stop an operation of detecting at least one of a media curved state and a media inclination while a feeding operation for the recording media P is continued by the feeder 40.

In the exemplary embodiment, when the result of detection of a media curved state detected by the detector 70 does not meet the required conditions allowing execution of the feeding operation for the recording media P by the feeder 40, the feeder 40 stops execution of the feeding operation for the recording media P, however, the configuration is not limited thereto.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A feeding device comprising:
    a feeder that feeds a first medium disposed on a top of a plurality of media loaded;
    an image capture unit that captures an image of both the first medium and following media, of the plurality of media, including a second medium disposed immediately below the first medium, the image being captured along a width direction crossing a thickness direction of the media;
    an identifier that identifies at least one of a curved state and an inclination of both the first medium and the following media including the second medium based on the image captured by the image capture unit; and
    a modifier that modifies a condition related to a feeding operation of the feeder based on the at least one of the curved state and the inclination identified by the identifier.

2. The feeding device according to claim 1,
    wherein the feeder adsorbs the first medium at an absorption position rearward of a front end of the first medium in the feed direction of the media,
    the image capture unit captures the image of both the first medium and the following media including the second medium from a lateral side of the media in a range including an area from an adsorption position of the feeder to a front end of the media, and
    the identifier identifies the at least one of the curved state and the inclination at the front end of the media.

3. The feeding device according to claim 2, further comprising:
    a sensor that senses a height of the first medium relative to a reference height, wherein
    the identifier identifies at least one of the curved state and the inclination based on the image captured by the image capture unit and the height sensed by the sensor.

4. The feeding device according to claim 3,
    wherein the image capture unit captures the image of both the first medium and the following media including the second medium from a lateral side of the media, and
    the identifier identifies the at least one of the curved state and the inclination in the width direction at a front end of the media.

5. The feeding device according to claim 1, further comprising:
    a sensor that senses a height of the first medium relative to a reference height, wherein
    the identifier identifies the at least one of the curved state and the inclination based on the image captured by the image capture unit and the height sensed by the sensor.

6. The feeding device according to claim 5,
    wherein the image capture unit captures the image of both the first medium and the following media including the second medium from a lateral side of the media, and
    the identifier identifies the at least one of the curved state and the inclination in the width direction at a front end of the media.

7. The feeding device according to claim 1, further comprising:
    an elevating unit that elevates the plurality of media loaded so that the first medium is located at a height for feeding by the feeder,
    wherein the identifier identifies the at least one of the curved state and the inclination after the plurality of media are elevated by the elevating unit and before the first medium is fed by the feeder, and
    the modifier modifies the condition before the first medium is fed by the feeder.

8. The feeding device according to claim 7, further comprising:
    a supply unit that supplies air into space between the plurality of media loaded to float the media,
    wherein the identifier identifies the at least one of the curved state and the inclination after the plurality of media are elevated by the elevating unit and before the air is supplied by the supply unit.

9. The feeding device according to claim 7,
    wherein the identifier repeats identification of the at least one of the curved state and the inclination while execution of a feeding operation for the media is continued by the feeder.

10. The feeding device according to claim 1, wherein the identifier identifies, as the curved state, a curve direction indicating whether a curve is convex upward or convex downward, a curve height indicating a height difference between an uppermost portion and a lowermost portion in the media, and a curve length indicating a distance between the uppermost portion and the lowermost portion in the feed direction or the width direction in the media.

11. The feeding device according to claim 1, wherein when a result of identification of the at least one of the curved state and the inclination identified by the identifier does not meet a required condition allowing execution of a feeding operation for the media by the feeder, the feeder stops execution of the feeding operation for the media.

12. An image forming apparatus comprising:
the feeding device according to claim 1; and
an image former that forms an image on a medium fed from the feeding device.

* * * * *